(12) United States Patent
Kumar et al.

(10) Patent No.: US 12,469,549 B2
(45) Date of Patent: Nov. 11, 2025

(54) PROCESS AND TEMPERATURE COMPENSATED WORD LINE UNDERDRIVE SCHEME FOR SRAM

(71) Applicant: STMicroelectronics International N.V., Geneva (CH)

(72) Inventors: Ashish Kumar, Ranchi (IN); Dipti Arya, Noida (IN)

(73) Assignee: STMicroelectronics International N.V., Geneva (CH)

( * ) Notice: Subject to any disclaimer, the term of this patent is extended or adjusted under 35 U.S.C. 154(b) by 190 days.

(21) Appl. No.: 18/231,461

(22) Filed: Aug. 8, 2023

(65) Prior Publication Data
US 2024/0071480 A1     Feb. 29, 2024

Related U.S. Application Data

(60) Provisional application No. 63/401,881, filed on Aug. 29, 2022.

(51) Int. Cl.
*G11C 8/08*         (2006.01)
*G11C 11/418*       (2006.01)

(52) U.S. Cl.
CPC .............. *G11C 11/418* (2013.01); *G11C 8/08* (2013.01)

(58) Field of Classification Search
CPC ......... G11C 11/418; G11C 7/04; G11C 7/227; G11C 8/08; G11C 8/18; G11C 8/10
See application file for complete search history.

(56) References Cited

U.S. PATENT DOCUMENTS

| | | | |
|---|---|---|---|
| 6,628,564 B1 | 9/2003 | Takita et al. | |
| 7,646,653 B2* | 1/2010 | Choi | G11C 11/4074 365/230.06 |
| 8,391,097 B2* | 3/2013 | Chan | G11C 8/08 365/189.11 |
| 8,681,566 B2* | 3/2014 | Kim | H03K 17/162 365/185.23 |
| 9,881,669 B1* | 1/2018 | Bringivijayaraghavan | G11C 11/418 |
| 9,922,702 B1 | 3/2018 | Shanmugam et al. | |
| 10,249,361 B2 | 4/2019 | Wang et al. | |
| 10,262,707 B2 | 4/2019 | Nii et al. | |
| 10,854,280 B2* | 12/2020 | Singh | G11C 11/419 |

(Continued)

FOREIGN PATENT DOCUMENTS

CN        104575580 A      4/2015

*Primary Examiner* — Khamdan N. Alrobaie
(74) *Attorney, Agent, or Firm* — Crowe & Dunlevy LLC

(57) ABSTRACT

Disclosed herein is an electronic device, including a plurality of row decoders. Each row decoder includes decoder logic generating an initial word line signal and word line driver circuitry generating an inverse word line signal at an intermediate node from the initial word line signal, and generating a word line signal at a word line node from the inverse word line signal. A word line underdrive p-channel transistor has a source coupled to the intermediate node, a drain coupled to a word line underdrive sink, and a gate controlled based upon the inverse word line signal. Negative bias generation circuitry generates the negative bias voltage at a gate of the word line underdrive p-channel transistor when the initial word line signal is at a logic high, and couples the gate of the word line underdrive p-channel transistor to ground when the initial word line signal is at a logic low.

14 Claims, 8 Drawing Sheets

(56) References Cited

U.S. PATENT DOCUMENTS

| | | |
|---|---|---|
| 12,205,634 B2* | 1/2025 | Wu ................... G11C 11/418 |
| 12,300,311 B1* | 5/2025 | Singh ................ G11C 11/418 |
| 2008/0273382 A1 | 11/2008 | Wang |
| 2010/0302880 A1 | 12/2010 | Wang et al. |
| 2012/0033522 A1* | 2/2012 | Chuang ................ G11C 8/08 |
| | | 365/230.06 |
| 2012/0092041 A1 | 4/2012 | Wang et al. |
| 2014/0016400 A1 | 1/2014 | Pelley et al. |
| 2015/0295492 A1 | 10/2015 | Li et al. |
| 2017/0098474 A1 | 4/2017 | Tran et al. |
| 2017/0301396 A1* | 10/2017 | Dhori ................ G11C 11/418 |
| 2018/0166127 A1 | 6/2018 | Pathak |
| 2019/0221256 A1 | 7/2019 | Kumar et al. |
| 2020/0035288 A1 | 1/2020 | Taghvaei et al. |
| 2021/0082496 A1* | 3/2021 | Mathur ............... G11C 11/419 |
| 2022/0036942 A1 | 2/2022 | Wang et al. |

* cited by examiner

PROCESS AND TEMPERATURE COMPENSATED WORD LINE UNDERDRIVE SCHEME FOR SRAM

RELATED APPLICATION

This application claims priority to United States Provisional Application for Patent No. 63/401,881, filed Aug. 29, 2022, the contents of which are incorporated by reference in their entirety.

TECHNICAL FIELD

This disclosure is directed to the field of static random access memory (SRAM) and, in particular, to an SRAM architecture utilizing a process and temperature compensated word line underdrive scheme so as to facilitate low voltage applications with high bitcell stability.

BACKGROUND

Static random access memory (SRAM) is used in many electronic devices in the modern world. Read and write speed of a SRAM is of paramount importance in many applications, since an SRAM that cannot keep up with data requests and data writes initiated by a microprocessor or a system on a chip will degrade performance of the electronic device into which it is integrated. In mobile device applications (smartphones, tablets, laptops, smartwatches, and other wearables), providing sufficient speed while maintaining low power consumption is also of importance, because such mobile devices are powered by rechargeable batteries and it is desired for those batteries to provide power for as long as possible between recharges. Still further, in such mobile device applications, it is desired for the SRAM, as well as other electronic components, to be as compact as possible so as to make room for as large a rechargeable battery as possible for a given portable housing size.

Reference is now made to FIG. 1 which shows a simplified block diagram of a memory circuit 10. The circuit 10 includes an array 12 of memory cells C arranged in rows and columns. The memory cells in each row are controlled by a word line from among word lines 14a, . . . , 14m. The memory cells in each column are connected to a bit line from among bit lines 16a, . . . , 16n. A row decoder circuit 18 receives a row address that is predecoded from an address 20 and decodes the bits of the row address to select and actuate one of the word lines 14a, . . . , 14m. A column decoder circuit 22 receives a column address that is predecoded from the address 20 and decodes the bits of the column address to select a plurality of the bit lines 16a, . . . , 16n. In write mode, data on the data input/output lines 24 is written to the memory cells which are located at the intersections of the selected one of the word lines 14a, . . . , 14m and the plurality of bit lines 16a, . . . , 16n selected by the address 20. In read mode, data stored in the memory cells which are located at the intersections of the selected one of the word lines 14a, . . . , 14m and the plurality of bit lines 16a, . . . , 16n selected by the address 20 is read out to the data input/output lines 24.

A successful read or write operation is contingent on application of the actuation voltage (typically a supply voltage Vdd) by the word line driver circuit at the selected one of the word lines 14a, . . . , 14m to each memory cell C in the selected row.

However, when the memory device is manufactured with transistors of a smaller size, such as in the case of low voltage applications, using the supply voltage to power the word lines can result in degraded static noise margins (SNM) within the memory cells. The degraded SNM may result from, for example, physical properties of the smaller transistors and transistor to transistor variation that may occur when manufacturing at the smaller sizes.

SNM is a characteristic that quantifies an amount of electric noise that a memory cell can withstand without compromising an integrity of a stored logic value. That is, the SNM refers to the amount of "stray" electric charge that the memory cell can manage before incorrectly switching the stored logic value, which causes a data loss error.

A typical memory cell is comprised of a pair of cross coupled inverters each selectively connected to a respective bit line or complementary bit line by a pass gate transistor activated by the word line. The SNM of a memory cell is a function of a strength of a pass gate of the memory cell versus a strength of a pull down gate (e.g., NMOS components) of the memory cell.

For example, a logic value of "0" may be represented in a memory cell as a stored voltage of 0 mV. Noise associated with the memory cell when a respective word line is activated may cause the stored voltage to actually be 150 mV. The stored value of 150 mV from the electric noise may be caused by crosstalk, electromagnetic interference, electrostatic interference, thermal noise, and so on. However, the stored voltage is still interpreted as a logic value of "0" because 150 mV is within the SNM of the memory cell. Thus, the memory cell can be said to have a SNM of at least 150 mV.

However, as memory cells are manufactured with smaller transistors, SNM also tends to become smaller. Accordingly, a memory cell manufactured with smaller transistors may have a SNM of 100 mV. Thus, when a source voltage (Vdd) is applied to the word line, noise associated with activating the word line can exceed the SNM of the memory cell. Consequently, a stored logic value may be erroneously switched when the source voltage is applied to the word line because of the degraded SNM.

By weakening the strength of the pass gate, i.e., reducing a voltage used to activate the word line, the SNM increases because the ratio of the strengths of the pass gate and pull down gate decreases. An increased SNM permits the memory cell to handle additional noise which causes the memory cell to be less likely to erroneously flip between stored logic values resulting in data errors, thereby enhancing stability of the bit cells (e.g., cross coupled inverters) within the memory cells.

Difficulty arises in that the amount of word line underdriving that achieves stability changes depending upon process corner and temperature.

One known way to achieve this is to use an NMOS (underdrive, pull-down or bleeder) transistor connected to the word line to act as a voltage divider with the PMOS transistor of the word line driver circuit, with the sizing of the NMOS transistor being set so as to achieve stability at the FS (fast N, slow P) corner (the worst corner) and high temperature. While this achieves stability, this underdriving level is in excess at the SF and SS corners (as well as low temperature), reducing speed. In addition, where the word line driver is a PMOS transistor, the PMOS word line driver and the NMOS word line underdrive transistor vary differently, adding further mismatch between the underdriving levels used (and underdriving levels that could otherwise be used) at certain corners and temperatures.

An improvement on this is to drive the gate of the NMOS transistor connected to the word line as a voltage divider with a temperature and process compensated gate voltage.

While this does reduce drawbacks with using the NMOS transistor as the underdriver, the mismatch resulting from the word line driver being a PMOS transistor while the word line underdriver is an NMOS transistor is still present. Moreover, the use of logic devices in the generation of the compensated gate voltage introduces its own mismatches between the transistors forming the bit cells within the memory cells and the transistors forming the logic devices.

Instead of using an NMOS transistor connected the word line as a voltage divider, a PMOS transistor may instead be connected to the word line as a voltage divider to cause underdriving of the word line. Utilizing a PMOS transistor does reduce mismatch because both the world line driver and word line underdrive transistor are PMOS transistors. However, since the sizing of the PMOS transistor is still based upon the FS corner, the resulting underdriving level is still in excess at the SF and SS corners (as well as low temperature), reducing potential speed.

An improvement lies in driving the gate of the PMOS transistor connected to the word line as a voltage divider with a temperature and process compensated gate voltage. While this does reduce drawbacks, the size of the PMOS transistor itself (since PMOS devices are physically larger than NMOS devices) puts a constraint on its usage as a word line underdriver.

In summary therefore, the limitations of the prior art described above are: the use of a single NMOS transistor as an underdriver saves space as compared to a PMOS transistor but speed optimization suffers; the use of an NMOS transistor with a temperature and process controlled gate voltage may involve greater area usage, but the underdriving level may move differently than the bit cells of the memory cells over process and temperature variation; and the use of a PMOS transistor with a temperature and process controlled gate voltage may involve even greater area usage than when compensating an NMOS transistor and the underdriving level may move differently than the bit cells of the memory cells over process and temperature variation.

There is therefore still a need for further development.

SUMMARY

Disclosed herein is an electronic device including a plurality of row decoders. Each row decoder includes: decoder logic configured to generate an initial word line signal; word line driver circuitry configured to generate an inverse word line signal at an intermediate node from the initial word line signal, and to generate a word line signal at a word line node from the inverse word line signal; and a word line underdrive p-channel transistor having a source coupled to the intermediate node, a drain, and a gate controlled based upon the inverse word line signal.

Control circuitry includes a word line underdrive sink circuit. The word line underdrive sink circuit includes first and second dummy memory cells. The first dummy memory cell includes: a first pass gate transistor having a conduction terminal connected to a first node, with other terminals thereof left floating; a second pass gate transistor having a first conduction terminal connected to a second node, a second conduction terminal connected to the drain of the word line underdrive p-channel transistor, and a gate connected to ground; a first inverter having an input connected to the second node, an output connected to the first node, and first and second power terminals left floating; and a second inverter having an input connected to the first node, an output connected to the second node, a first power terminal connected to a voltage supply node, and a second power terminal left floating. The second dummy memory cell includes: a third pass gate transistor having a first conduction terminal connected to a third node, with other terminals thereof left floating; a fourth pass gate transistor having a first conduction terminal connected to a fourth node, a second conduction terminal connected to the drain of word line underdrive p-channel transistor, and a gate connected to the voltage supply node; a third inverter having an input connected to the fourth node, an output connected to the third node, and first and second power terminals left floating; and a fourth inverter having an input connected to the third node, an output connected to the fourth node, a first power terminal left floating, and a second power terminal connected to ground. The second node and fourth node are connected to a common node, the third node is connected to the voltage supply node, and the first node is connected to receive an inverse of a clock signal.

The first inverter includes: a first p-channel transistor having a source left floating, a drain connected to the first node, and a gate connected to the second node; and a first n-channel transistor having a drain connected to the first node, a source left floating, and a gate connected to the second node.

The second inverter includes: a second p-channel transistor having a source connected to the voltage supply node, a drain connected to the second node, and a gate connected to the first node; and a second n-channel transistor having a drain connected to the second node, a source left floating, and a gate connected to the first node;

The third inverter includes: a third p-channel transistor having a source left floating, a drain connected to the third node, and a gate connected to the fourth node; and a third n-channel transistor having a drain connected to the third node, a source left floating, and a gate connected to the fourth node.

The fourth inverter includes: a fourth p-channel transistor having a source left floating, a drain connected to the fourth node, and a gate connected to the third node; and a fourth n-channel transistor having a drain connected to the fourth node, a source connected to ground, and a gate connected to the third node.

The gate of the word line underdrive p-channel transistor is connected to the intermediate node.

The row decoder also includes gate drive circuitry that drives the gate of the word line underdrive p-channel transistor based upon the inverse word line signal. The gate drive circuitry includes negative bias generation circuitry configured to generate a negative bias voltage at the gate of the word line underdrive p-channel transistor when the initial word line signal is at a logic high, and to couple the gate of the word line underdrive p-channel transistor to ground when the initial word line signal is at a logic low.

The gate drive circuitry includes: a drive inverter having an input coupled to the inverse word line signal, an output coupled to the gate of the word line underdrive p-channel transistor, a first power terminal connected to the voltage supply node, and a second power terminal connected to a node; a negative bias generating n-channel transistor having a drain connected to the node, a source connected to ground, and a gate connected to receive a negative bump signal, the negative bump signal being generated based upon the clock signal; and a capacitor connected between the node and a delayed version of the negative bump signal.

The control circuitry also includes a first logic circuit configured to generate the negative bump signal based upon the clock signal and a second logic circuit configured to delay the negative bump signal to produce the delayed version of the negative bump signal.

The first logic circuit includes a NAND gate having inputs receiving the inverse of the clock signal and a delayed version of the inverse of the clock signal, and generating the negative bump signal based upon performing a logical NAND operation on the inverse of the clock signal and the delayed version of the inverse of the clock signal.

The second logic circuit includes a first inverter receiving the negative bump signal as input and a second inverter receiving output of the first inverter as input and generating the delayed version of the negative bump signal as output.

The input of the drive inverter is coupled to the inverse word line signal through an inverter.

The drive inverter includes: a p-channel transistor having a source connected to the voltage supply node, a drain connected to the drain of the word line underdrive p-channel transistor, and a gate connected to a net node; and an n-channel transistor having a drain connected to the drain of the word line underdrive p-channel transistor, a source connected to the node of the negative bias generation circuitry, and a gate connected to the net node; and wherein the negative bias generation circuitry further comprises an inverter receiving the inverse word line signal as input and providing output to the net node.

An SRAM memory has a plurality of rows, each of the plurality of rows being associated with a given one of the plurality of row decoders.

The control circuitry is global with respect to each of the plurality of row decoders.

The control circuitry may be replicated so as to be local to each of the plurality of row decoders.

DETAILED DESCRIPTION

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein.

Figure 1:
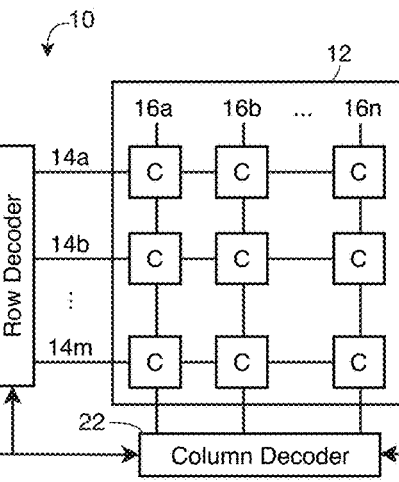
FIG. 1 is a block diagram of a prior art memory architecture.
Figure 2:
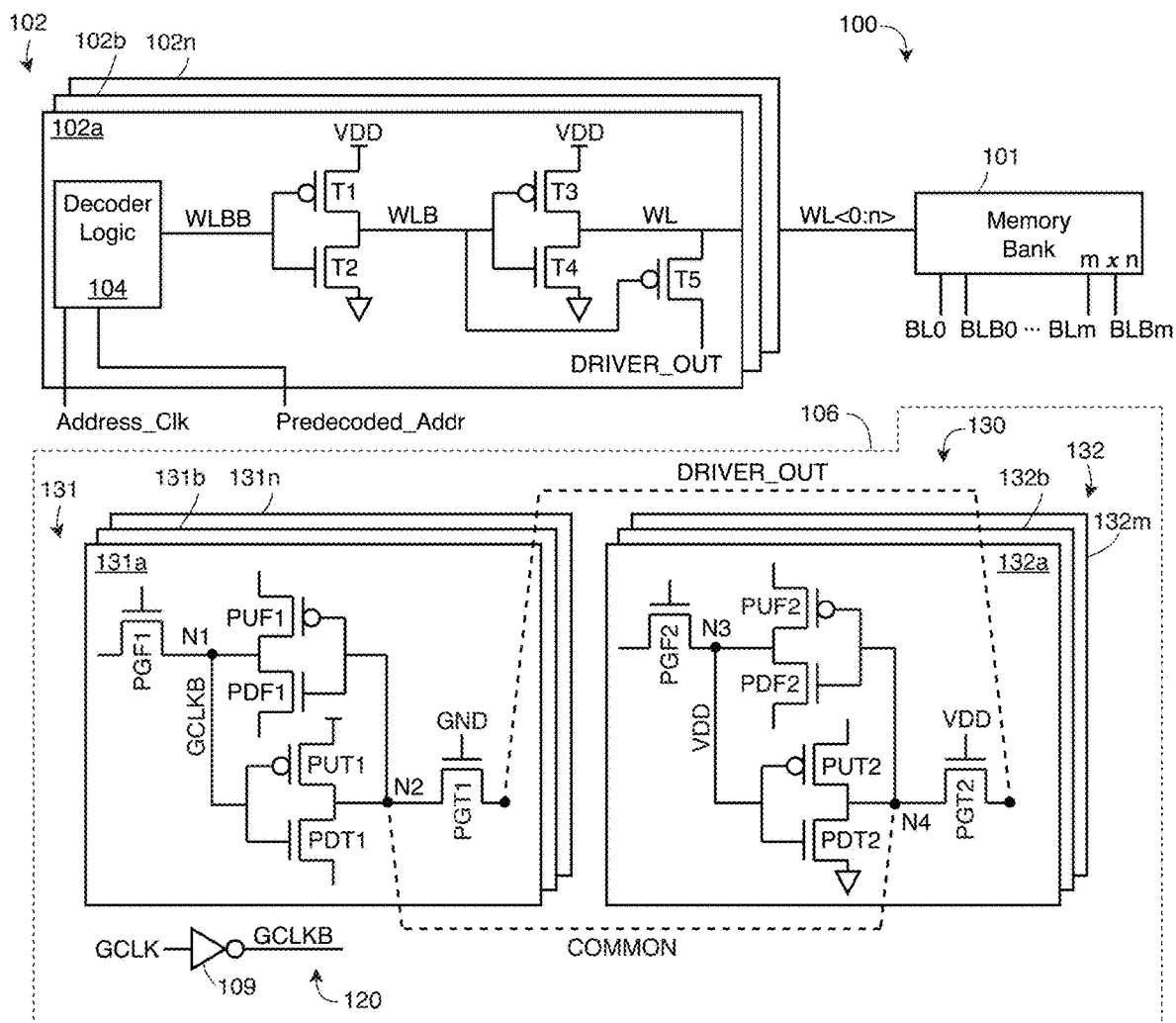
FIG. 2 is a schematic block diagram of a memory architecture disclosed herein that utilizes word line underdrive compensation.

Now described with reference to FIG. 2 is an SRAM architecture 100 comprised of an m-by-n SRAM memory 101 (having m columns and n rows), row decoders 102a, . . . , 102n, column decoders (not shown), and a pre-decoder (not shown). The number of row decoders 102 and the number of rows in the SRAM 101 are equal, and each row decoder is paired to one row of the SRAM 101.

The row decoder 102a will now be described, but it will be understood that the remainder of the row decoders 102b, . . . , 102n have the same structure. The pre-decoder receives an address, pre-decodes the address, and sends the pre-decoded address Predecoded_Addr to decoder logic 104 within the row decoder 102a. From the pre-decoded address Predecoded_Addr, the decoder logic 104 generates a word line signal WLBB. A CMOS inverter formed by p-channel transistor T1 and n-channel transistor T2 receives the word line signal WLBB at its input, and outputs an inverse word line signal WLB. A CMOS inverter formed by p-channel transistor T3 and n-channel transistor T4 receives the inverse word line signal WLB at its input, and outputs a word line signal WL for the row of the SRAM 101 corresponding to decoder 102a.

As to the structure of the inverters, the inverter formed by transistors T3 and T4 is formed by the p-channel transistor T3 having its source connected to a supply voltage, its drain connected to a drain of the n-channel transistor T4, and its gate connected to both the gate of n-channel transistor T4 and the drains of transistors T1 and T2. The n-channel transistor T4 has its drain connected to the drain of the p-channel transistor T3, its source connected to ground, and its gate connected to both the gate of the p-channel transistor T4 and the drains of transistors T1 and T2.

The inverter formed by transistors T1 and T2 is formed by the p-channel transistor T1 having its source connected to a supply voltage, its drain connected to a drain of the n-channel transistor T2, and its gate connected to the gate of the n-channel transistor T2 as well as to the output of the decoder logic 104. The n-channel transistor T2 has its drain connected to the drain of the p-channel transistor T1, has its gate connected to the gate of the p-channel transistor T1 as well as to the output of the decoder logic 104, and has its source connected to ground.

A p-channel word line underdrive transistor T5 has its source connected to the word line WL, its drain connected to a drive output signal DRIVER_OUT, and its gate connected to receive the inverse word line signal WLB. As will be explained below, the generation of the driver output signal DRIVER_OUT provides compensation.

A temperature and process compensated source control signal generator 106 generates the drive output signal DRIVER_OUT. The temperature and process compensated source control signal generator 106 may be located in global control or in local control, and includes logic circuitry 120 having an inverter 109 that generates the inverse GCLKB of the global clock signal GCLK. The control signal generator 106 further includes a dummy memory array 130 with m dummy cells 132a, . . . , 132m and n dummy cells 131a, . . . , 131n.

The dummy memory cell 132a is now described, but it will be understood that the remainder of the memory cells 132b, . . . , 132m have the same structure. The dummy memory cell 132a includes a floating inverter formed by transistors PDF2 and PDF2 having an input connected to node N4 to receive a common signal COMMON (to provide for a process compensated sink) and an output connected to node N3, and an inverter formed by transistors PUT2 and PDT2 having an input connected to node N3 and an output connected to node N4. A pass gate transistor PGT2 is an n-channel transistor having its drain connected to node N4, its source connected to provide the driver output signal DRIVER_OUT, and its gate connected to the supply voltage VDD. A floating pass gate transistor PGF2 is an n-channel transistor having its drain left floating, its source connected to node N3, and its gate left floating.

As to the structure of the inverters of the dummy memory cell 132a, the floating inverter formed by transistors PDF2 and PDF2 is formed by the p-channel pull-up transistor PDF2 having its source left floating, its drain connected to node N3, and its gate connected to node N4 to receive the common signal COMMON, and the n-channel pull-down transistor PDF2 having its drain connected to node N3, its source left floating, and its gate connected to node N4 to receive the common signal COMMON.

The inverter formed by the transistors PUT2 and PDT2 is formed by the p-channel pull-up transistor PUT2 having its source left floating, its drain connected to node N4 to receive the common signal COMMON, and its gate connected to node N3 to receive the supply voltage VDD, and the n-channel pull-down transistor PDT2 having its drain connected to node N4 to receive the common signal COMMON, its source connected to ground, and its gate connected to node N3 to receive the supply voltage VDD.

The dummy memory cell 131a is now described, but it will be understood that the remainder of the memory cells 131b, . . . , 131n have the same structure. The dummy memory cell 131a includes a floating inverter formed by transistors PUF1 and PDF1 having an input connected to node N2 to receive the common signal COMMON and an output connected to node N1, and an inverter formed by transistors PUT1 and PDT1 having an input connected to node N1 and an output connected to node N2. A pass gate transistor PGT1 is an n-channel transistor having its source connected to node N2, its source connected to provide the driver output signal DRIVER_OUT, and its gate connected to the ground. A floating pass gate transistor PGF1 is an n-channel transistor having its drain left floating, its source connected to node N1, and its gate left floating.

As to the structure of the inverters of the dummy memory cell 131a, the floating inverter formed by transistors PUF1 and PDF1 is formed by the p-channel pull-up transistor PUF1 having its source left floating, its drain connected to node N1, and its gate connected to node N2 to receive the common signal COMMON, and the n-channel pull-down transistor PDF1 having its drain connected to node N1, its source left floating, and its gate connected to node N2 to receive the common signal COMMON.

The inverter formed by the transistors PUT1 and PDT1 is formed by the p-channel pull-up transistor PUT1 having its source left floating, its drain connected to node N2 to receive the common signal COMMON, and its gate connected to node N1 to receive the inverse CLKB of the global clock signal, and the n-channel pull-down transistor PDT1 having its drain connected to node N2 to receive the common signal COMMON, its source connected to ground, and its gate connected to node N1 to receive the inverse CLKB of the global clock signal.

In operation, first consider the case where the predecoded address Predecoded_Addr does not activate the decoder 102a, and therefore the word line WL associated with the decoder 102a is not to be driven high upon the address clock Address_Clk (derived from the global clock signal GCLK) rising high. In this condition, the word line signal WLBB is therefore deasserted by the decoder 102a, with the result being that the word line signal WLB is asserted by the inverter formed by transistors T1 and T2. The word line signal WLB being asserted turns off the underdrive transistor T5.

In this condition, when the global clock signal GCLKB is at a logic high, transistor PUT1 is maintained as being off. Therefore, the common signal COMMON will be pulled to ground (0 volts) by transistor PDT2 being turned on by the supply voltage VDD, and the pass gate transistor PGT2 will pass the common signal COMMON as the driver output signal DRIVER_OUT because the pass gate transistor PGT2 is turned on by the supply voltage VDD.

Now consider the case where the predecoded address Predecoded_Addr activates the decoder 102a indicating that the word line WL associated with that decoder 102 is to be driven high upon the address clock Address_Clk rising high. Therefore, upon the address clock Address_Clk being driven high, the decoder logic 104 drives the word line signal WLBB high, with the inverter formed by transistors T1 and T2 therefore deasserting the word line signal WLB and turning on the underdrive transistor T5, with the level of underdriving being controlled by the driver output signal DRIVER_OUT.

In this condition, when the global clock signal GCLKB is at a logic low, transistor PUT1 is turned on, sourcing current to node N2 and therefore raising the common signal COMMON. The pass gate transistor PGT2 will pass the common signal COMMON as the driver output signal DRIVER_OUT because PGT2 is turned on by the supply voltage VDD.

Since the common signal COMMON is generated using the dummy memory cells 131 and 132, it will track the memory cells of the memory bank 101 over different process corners, and across process, voltage, and temperature variations. Still further, there is no process mismatch between the word line driver formed by transistors T3 and T4 and the word line underdriver formed by transistor T5 (since transistor T5 is a p-channel transistor). Therefore, word line underdriving is delivered by this SRAM architecture 100, without the drawbacks of the prior art being present.

Figure 3:
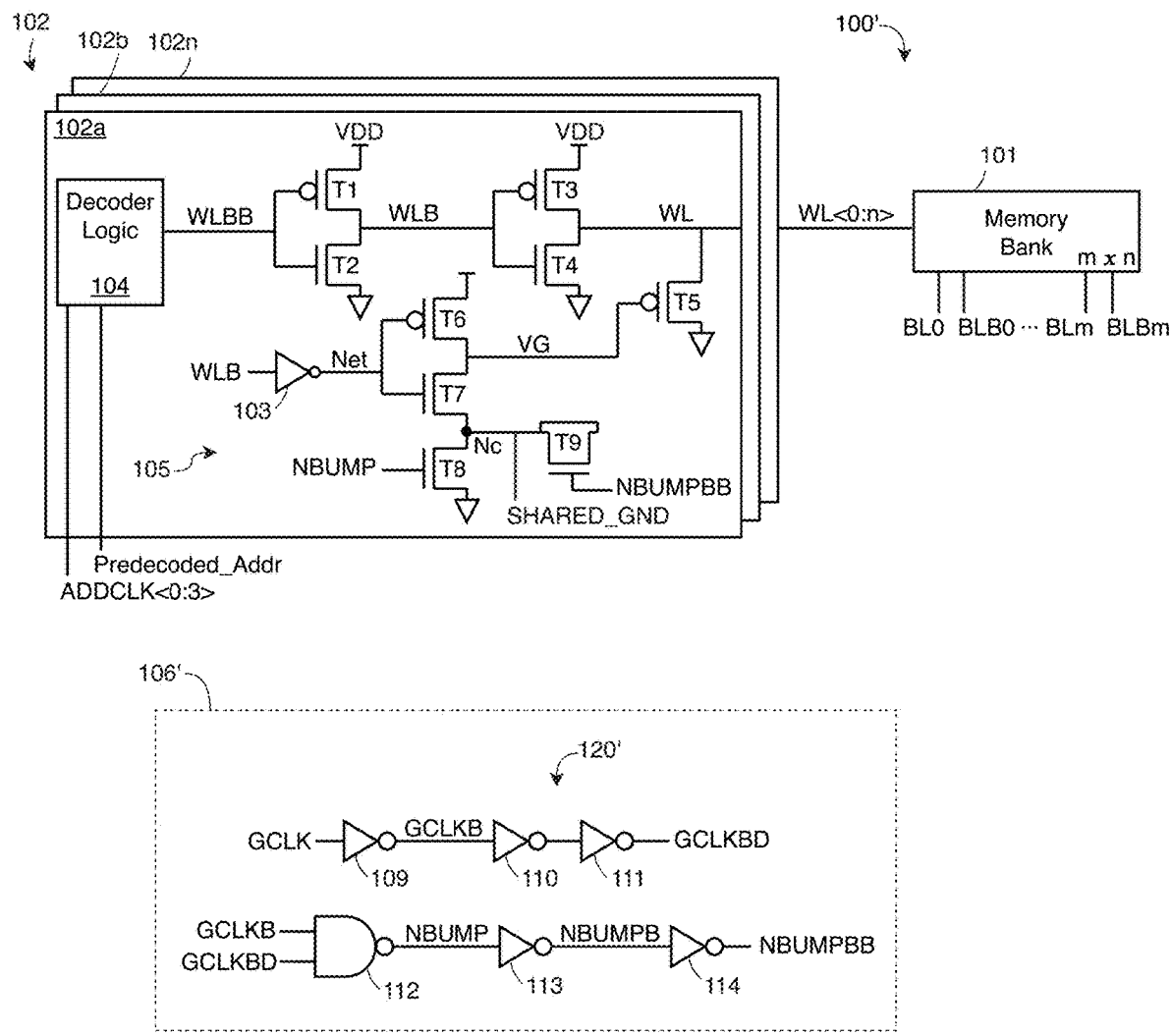
FIG. 3 is a schematic block diagram of a memory architecture disclosed herein that utilizes a negative voltage as a gate drive signal for the underdrive transistors of the row decoders to enable the decrease in size of those underdrive transistors.

Now described with reference to FIG. 3 is a SRAM architecture 100'. The difference in this embodiment as compared to the SRAM architecture 100 of FIG. 2 is in the control of the underdrive transistor T5. Here, gate drive circuitry 105 generates a gate drive signal VG for the gate of the transistor T5.

The gate drive circuitry 105 includes an inverter 103 that inverts the inverse word line signal WLB to produce a signal Net. A CMOS inverter formed by transistors T6 and T7 receives the signal Net as input and generates the gate drive signal VG as output. The CMOS inverter is powered between the supply voltage and a node Nc, and more specifically, can be described as being formed by p-channel transistor T6 having its source connected to the supply voltage, its drain connected to the gate of p-channel transistor T5, and its gate connected to the gate of n-channel transistor T7 and to receive the Net signal, as well as the n-channel transistor T7 having its drain connected to the drain of the p-channel transistor T6, its source connected to node Nc to receive a shared ground SHARED_GND, and its gate connected to the gate of the p-channel transistor T6 and to receive the net signal Net. An n-channel transistor T8 has its drain connected to node Nc, its source connected to ground, and its gate connected to receive a negative bump enable signal NBUMP. A capacitor T9 has a first terminal connected to node Nc and its second terminal connected to the negative bump enable signal NBUMPBB. This capacitor T9 is illustratively formed from a MOS transistor, but could also be a discrete capacitor.

The negative bump enable signal NBUMP and negative bump enable signal NBUMPBB are generated by the temperature and process compensated source control signal generator 106'. The control signal generator 106' includes logic circuitry 120'. The logic circuitry 120' includes a timing generation circuit including an inverter 109 receiving the global clock signal GCLK and generating an inverse GCLKB of the global clock signal, with the inverters 110 and 111 generating a delayed version GCLKBD of the inverse of the global clock signal. The control signal generator 106 also includes a NAND gate 112 that performs a logical NAND operation on GCLKB and GCLKBD to produce the negative bump enable signal NBUMP, an inverter 113 that generates the inverse negative bump enable signal NBUMPB from NBUMP, and an inverter 114 that generates the negative bump enable signal NBUMPBB from NBUMPB.

In operation, where the predecoded address Predecoded_Addr does not activate the decoder 102a, the word line WL associated with the decoder 102a is not to be driven high upon the address clock Address_Clk rising high. In this condition, the word line signal WLBB is therefore deasserted by the decoder 102a, with the result being that the word line signal WLB is asserted by the inverter formed by transistors T1 and T2. The word line signal WLB being asserted results in deassertion of the Net signal, turning on transistor T6 while turning off transistor T7. Since transistor T6 is turned on, the gate drive signal VG will rise high, turning off transistor T5.

In this condition, at the beginning of a clock cycle in which the inverse of the global clock GCLKB goes high, the delayed version GCLKBD will still be low, and therefore the negative bump enable signal NBUMP will be at a logic high. NBUMP being high will turn on transistor T8, coupling the source of transistor T7 to ground, pulling node Nc to actual ground (zero volts).

Since transistor T9 is configured as a capacitor, with its bulk (substrate) tied to its drain and source acting as one plate, and its gate acting as the other plate, when the delayed negative bump enable signal NBUMPBB rises high after the negative bump enable signal NBUMP signal rises high due to the delay provided by the inverters 113 and 114, the transistor T9 (acting as a capacitor) is charged to NBUMPBB due to this positive voltage at its bottom plate (its gate), and due to ground at its top plate (its bulk).

Now, when the predecoded address Predecoded_Addr activates the decoder 102a indicating that the word line WL associated with that decoder 102 is to be driven high upon the address clock Address_Clk rising high, the decoder logic 104 drives the word line signal WLBB high, with the inverter formed by transistors T1 and T2 therefore deasserting the word line signal WLB and the inverter 103 asserting the net signal Net.

This has the effect of turning on transistor T7 and turning off transistor T6. In a clock cycle in which the inverse of the global clock CLKB goes low, once the delayed version of GCLKBD follows and goes low, NBUMP will go low, turning off the transistor T8 and pulling NBUMPBB to ground. NBUMPBB being pulled to ground results in a negative voltage appearing at the top plate of the capacitor transistor T9, and this voltage is therefore present at the source of the n-channel transistor T7 at the node Nc, with the gate drive signal VG resultingly being pulled negative. This effectively reduces the threshold voltage Vt of the transistor T5, and improves (reduces the slope) of the voltage of the word line WL over what it otherwise would have been had the source of the transistor T5 been tied to ground instead of the negative voltage. This allows the size of the transistor T5 to be physically smaller than it would be if its drain were grounded in order to conduct the same current. Since the physical size of p-channel transistors is of concern, this negative gate biasing is of value for the underdrive transistor T5.

Figure 4:
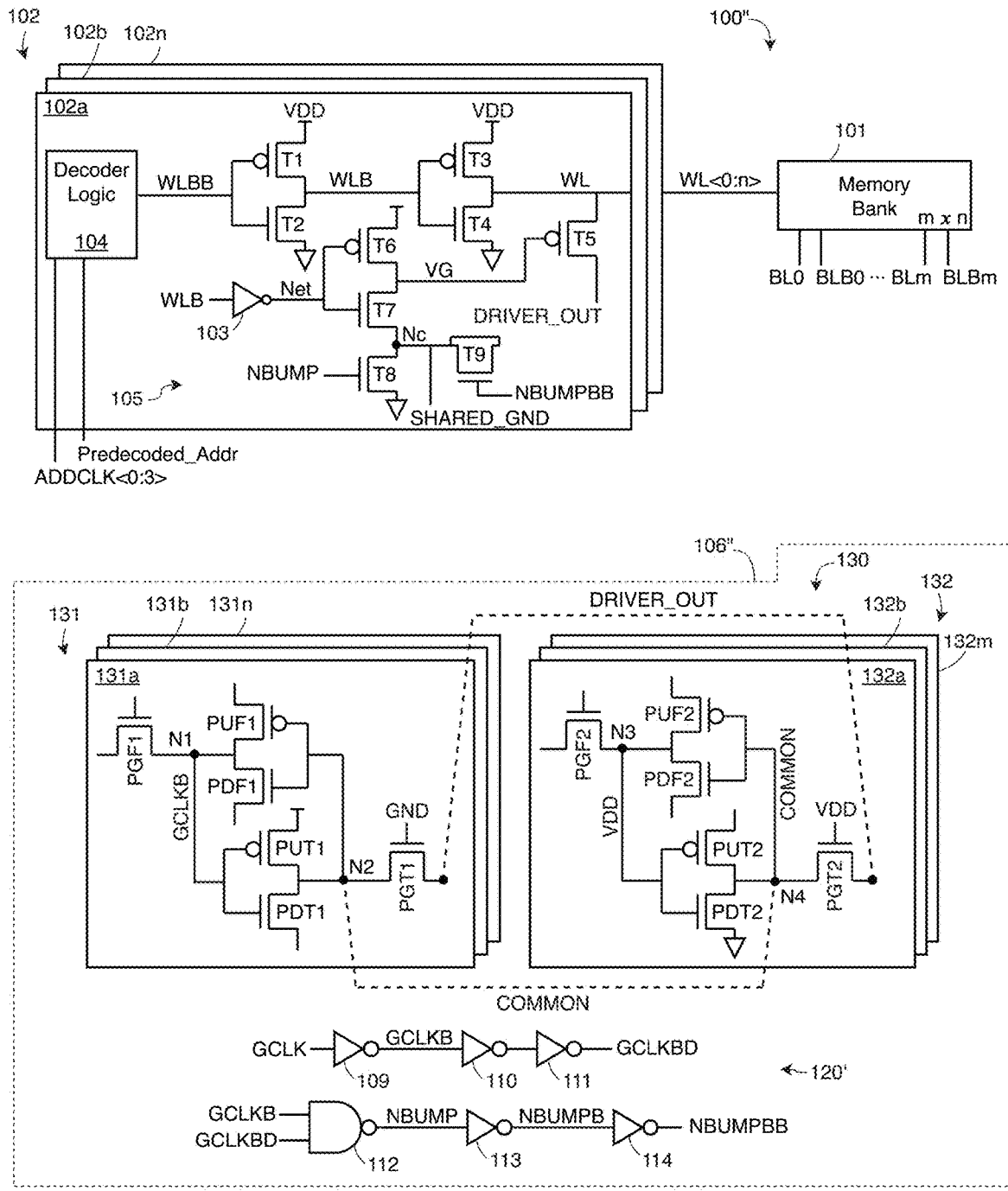
FIG. 4 is a schematic block diagram of a memory architecture disclosed herein that utilized word line underdrive compensation, and also utilizes a negative voltage as a gate drive signal for the underdrive transistors of the row decoders to enable the decrease in size of those underdrive transistors.

Now described with reference to FIG. 4 is a SRAM architecture 100". This embodiment is a combination of the SRAM architecture 100 of FIG. 2 and the SRAM architecture 100' of FIG. 3. In particular, the underdrive transistor T5 has its drain connected to the DRIVER_OUT signal generated by the dummy memory array 130 as in FIG. 2, while the gate of the transistor T5 has its gate connected to a negative bias generated by the gate drive circuitry 105 as in FIG. 3. This combines the compensated word line underdriving of FIG. 2 with the underdrive transistor area reduction of FIG. 3.

Figure 5:
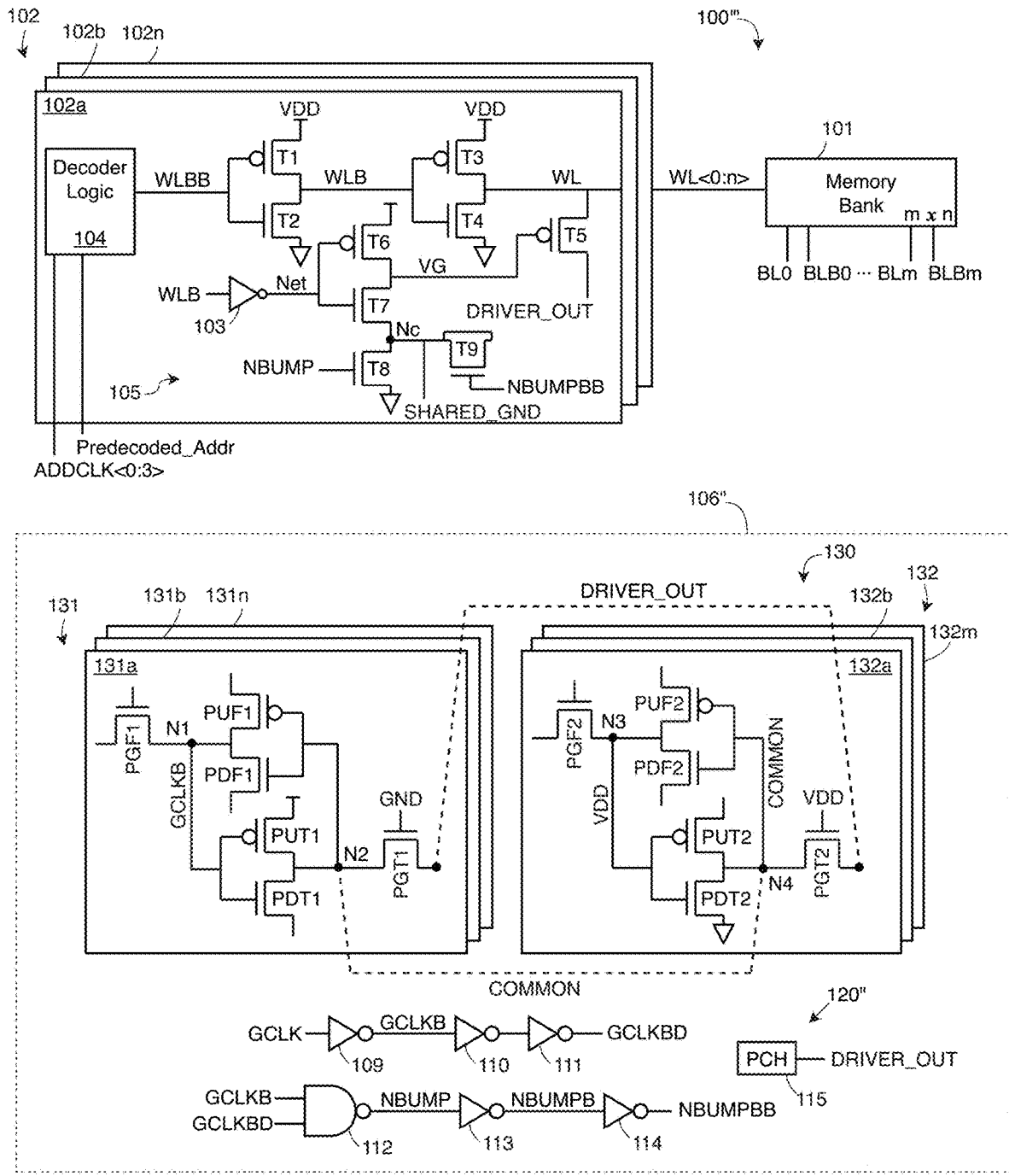
FIG. 5 is a schematic block diagram of a memory architecture disclosed herein that utilized word line underdrive compensation, and also utilizes a negative voltage as a gate drive signal for the underdrive transistors of the row decoders to enable the decrease in size of those underdrive transistors in which the driver output signal used to compensate the underdrive transistors is connected to pre-charge circuitry.

Now described with reference to FIG. 5 is a SRAM architecture 100''' similar to the SRAM architecture 100" of FIG. 4, but with a precharge circuit 15 that precharges the driver output signal DRIVER_OUT, for example to VDD/2, providing for the ability to more quickly reach the full word line underdriving amount.

Figure 6:
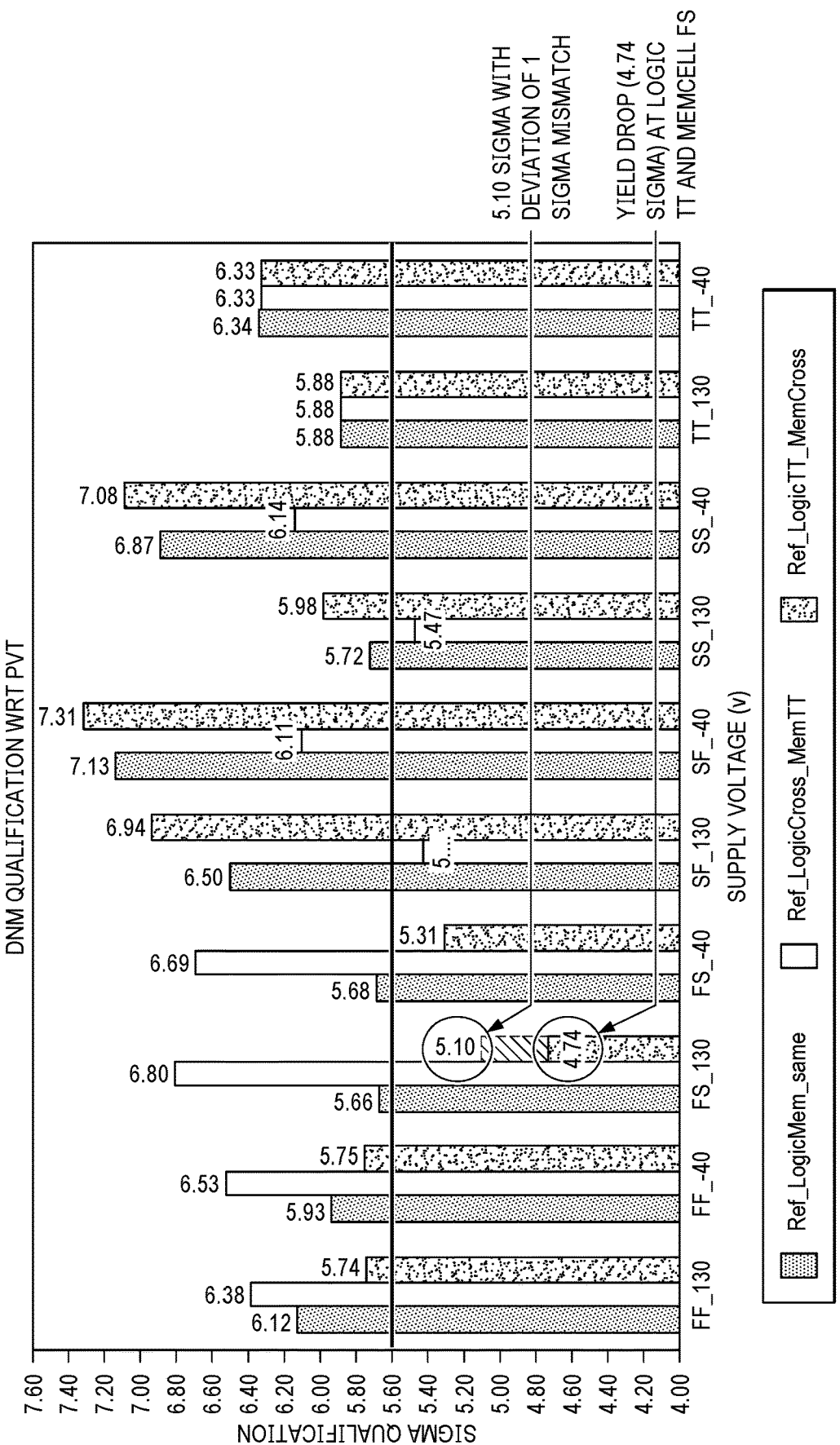
FIG. 6 is a graph showing sigma qualification of dynamic noise margin of prior art designs.
Figure 7:
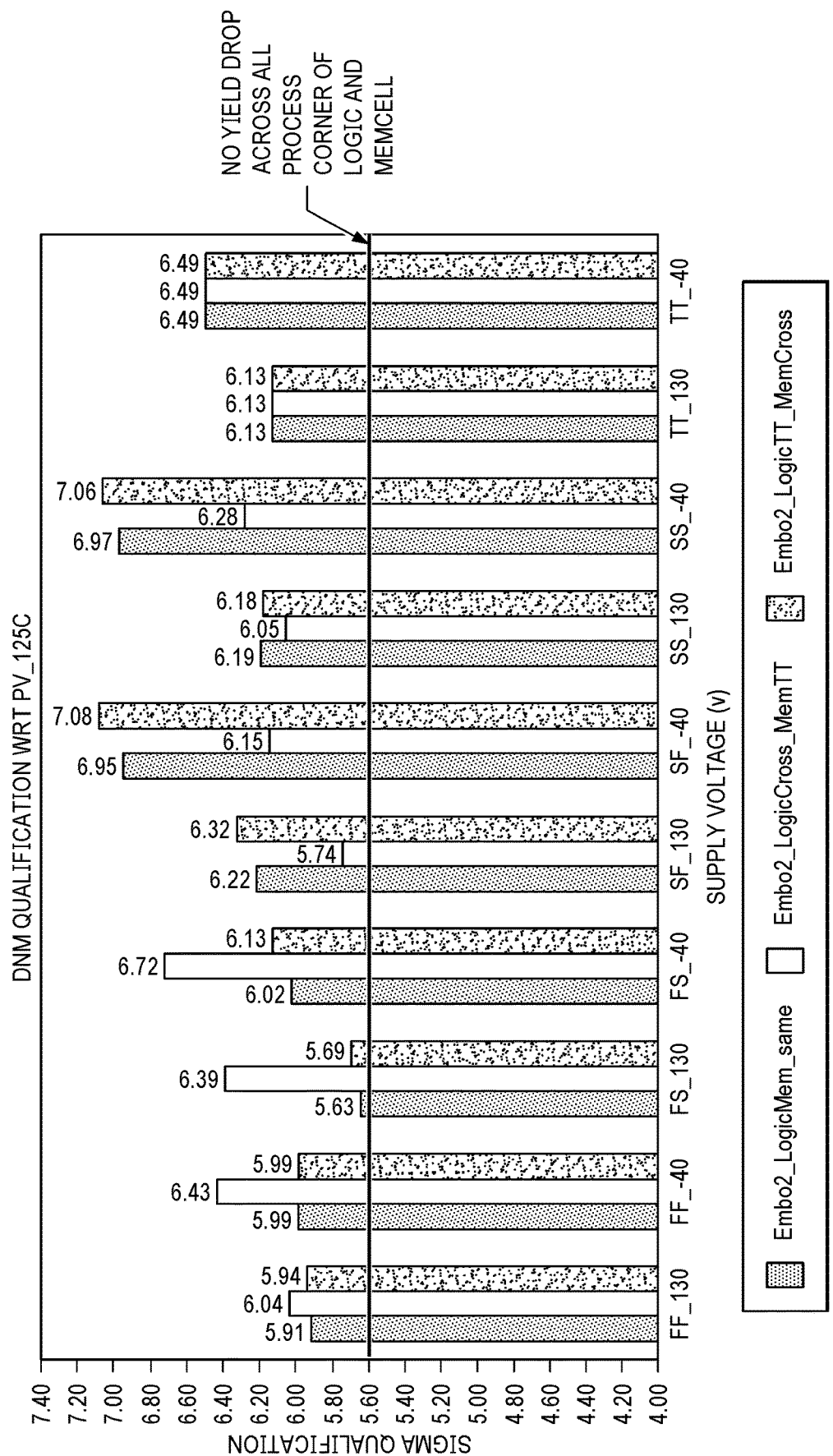
FIG. 7 is a graph showing sigma qualification of dynamic noise margin of the SRAM architecture of FIG. 2.
Figures 8A, 8B:
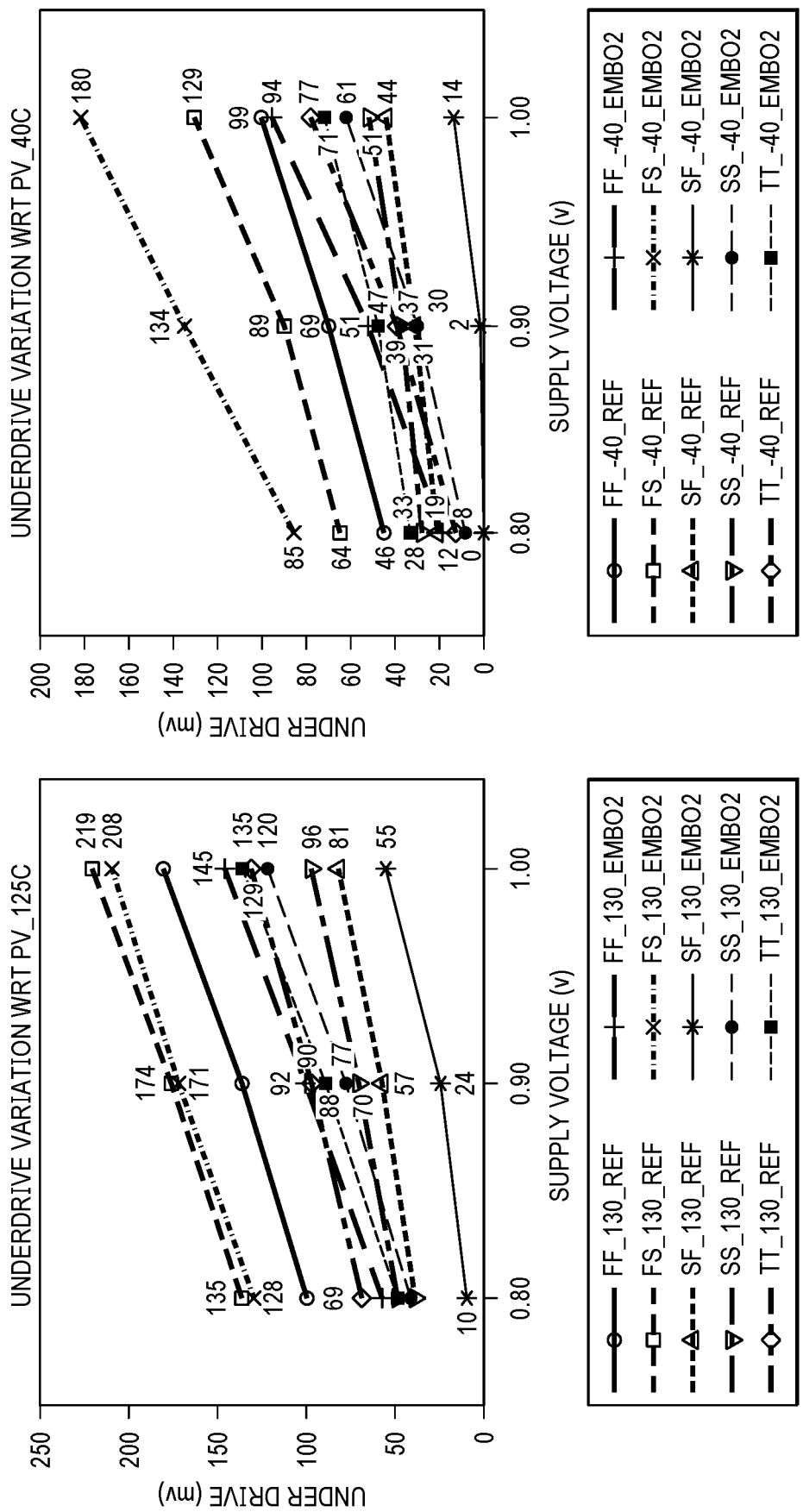
FIGS. 8A-8B includes graphs showing underdrive variation across process, voltage, and temperature variation of the SRAM architecture of FIG. 2 as compared to prior art SRAM architectures.
Figure 9B:
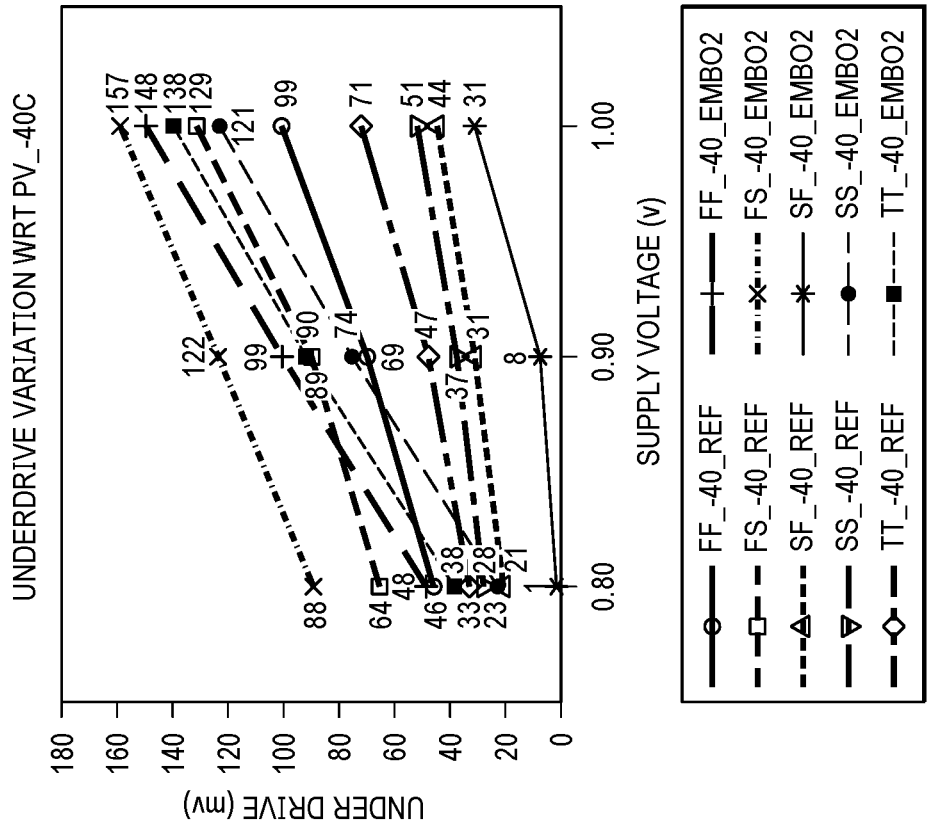
FIGS. 9A-9B includes graphs showing underdrive variation across process, voltage, and temperature variation of the SRAM architecture of FIG. 4 as compared to prior art SRAM architectures.
Figure 9A:
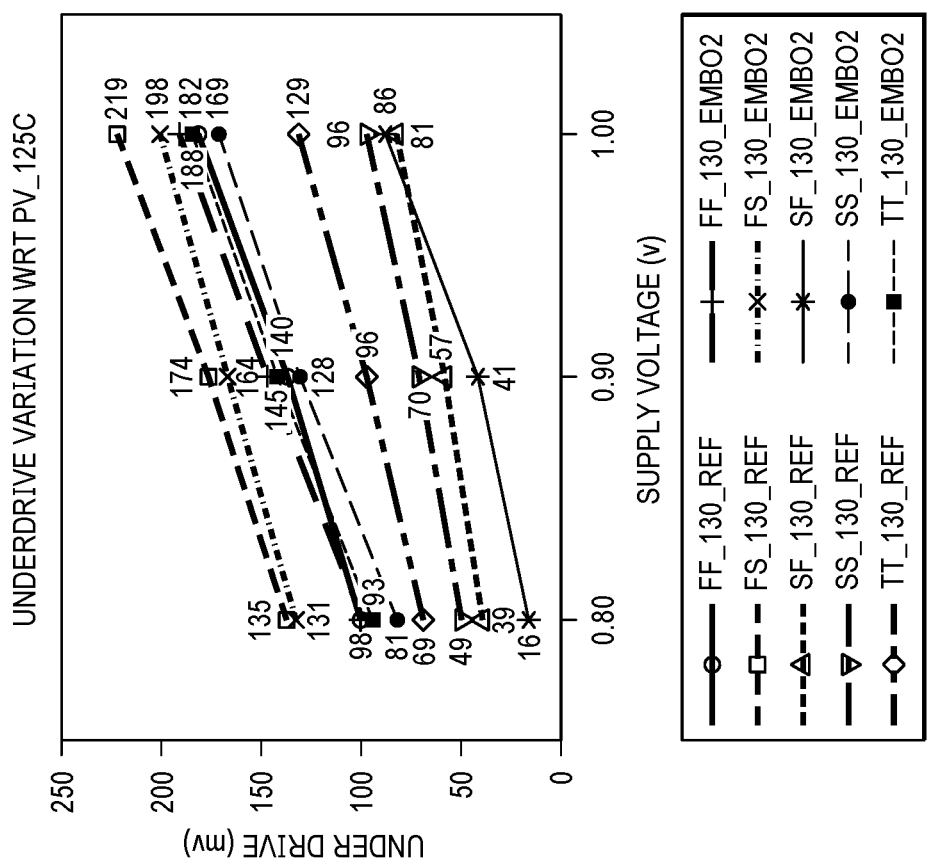

The SRAM architectures described above enable a higher sigma level qualification for dynamic noise margin (DNM) than prior art SRAM architectures. Refer now to FIG. 6, which is a graph showing sigma qualification for DNM for a prior art design. Notice that when the logic is at a typical corner while the memory is at a cross corner (particularly the FS corner), the yield drops to 4.74 Sigma, failing to meet the desired level of 5.6 Sigma. Turn now to FIG. 7, where it can be seen that in the same condition, there is no yield drop with the SRAM architectures described above.

The SRAM architectures described above also provide for excellent performance despite being compensated across process, voltage, and temperature variations for all corners. For example, at corners where performance is of concern, such as SF, the level of underdriving is less than with prior art SRAM architectures. This can be observed in FIGS. 8A, 8B, 9A, and 9B where for the SF corner, the SRAM architectures described above (shown by the solid lines) have less word line underdrive than prior art SRAM architectures (shown by the dotted lines).

It is clear that modifications and variations may be made to what has been described and illustrated herein, without thereby departing from the scope of this disclosure, as defined in the annexed claims.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. An electronic device, comprising:
a plurality of row decoders, each row decoder comprising:
   decoder logic configured to generate an initial word line signal;
   word line driver circuitry configured to generate an inverse word line signal at an intermediate node from the initial word line signal, and to generate a word line signal at a word line node from the inverse word line signal;
   a word line underdrive transistor having a first conduction node coupled to the intermediate node, a second conduction node coupled to a word line underdrive sink, and a gate controlled based upon the inverse word line signal; and
   negative bias generation circuitry configured to generate a negative bias voltage at the gate of the word line underdrive transistor when the initial word line signal is at a logic high, and to couple the gate of the word line underdrive transistor to ground when the initial word line signal is at a logic low.

2. The electronic device of claim 1, wherein the word line underdrive transistor is a p-channel transistor having a source coupled to the intermediate node and a drain coupled to the word line underdrive sink.

3. The electronic device of claim 1, wherein the negative bias generation circuitry comprises:
   a drive inverter having an input coupled to the inverse word line signal, an output coupled to the gate of the word line underdrive transistor, a first power terminal connected to a voltage supply node, and a second power terminal connected to a node;
   a negative bias generating n-channel transistor having a drain connected to the node, a source connected to ground, and a gate connected to receive a negative bump signal, the negative bump signal being generated based upon a clock signal; and
   a capacitor connected between the node and a delayed version of the negative bump signal.

4. The electronic device of claim 3, wherein the drive inverter comprises: a p-channel transistor having a source connected to the voltage supply node, a drain connected to the drain of the word line underdrive transistor, and a gate connected to a net node; and an n-channel transistor having a drain connected to the drain of the word line underdrive transistor, a source connected to the node of the negative bias generation circuitry, and a gate connected to the net node; and wherein the negative bias generation circuitry further comprises an inverter receiving the inverse word line signal as input and providing output to the net node.

5. The electronic device of claim 3, wherein the input of the drive inverter is coupled to the inverse word line signal through an inverter.

6. The electronic device of claim 1, further comprising a pre-charge circuit configured to pre-charge the word line underdrive sink to a predetermined intermediate voltage prior to assertion of the negative bias voltage.

7. The electronic device of claim 6, wherein the pre-charge circuit pre-charges the word line underdrive sink to approximately one-half of a supply voltage level.

8. The electronic device of claim 1, wherein a temperature and process compensated source control signal generator, comprising the negative bias generation circuitry, is disposed in a global control block common to all of the plurality of row decoders.

9. The electronic device of claim 1, wherein the word line driver circuitry comprises a first CMOS inverter stage that generates the inverse word line signal at the intermediate node and a second CMOS inverter stage that generates the word line signal at the word line node.

10. The electronic device of claim 1, wherein the initial word line signal is clocked by an address clock derived from a global clock, and the negative bias generation circuitry generates the negative bias voltage in synchronization with a delayed version of the global clock.

11. The electronic device of claim 3, wherein the negative bump signal is generated by a NAND gate receiving as inputs an inverse global clock signal and a delayed version thereof.

12. The electronic device of claim 3, further comprising an inverter chain configured to produce the delayed version of the negative bump signal.

13. The electronic device of claim 1, wherein the word line underdrive transistor is sized smaller than an equivalent transistor without negative bias generation, by virtue of the negative bias voltage reducing its effective threshold voltage.

14. The electronic device of claim 1, further comprising a dummy memory array having a plurality of dummy cells that generate a driver output signal to track process, voltage, and temperature variations.

* * * * *